Aug. 14, 1934.  M. ZAIGER  1,970,482
WINDSHIELD HEATER
Filed Nov. 10, 1933
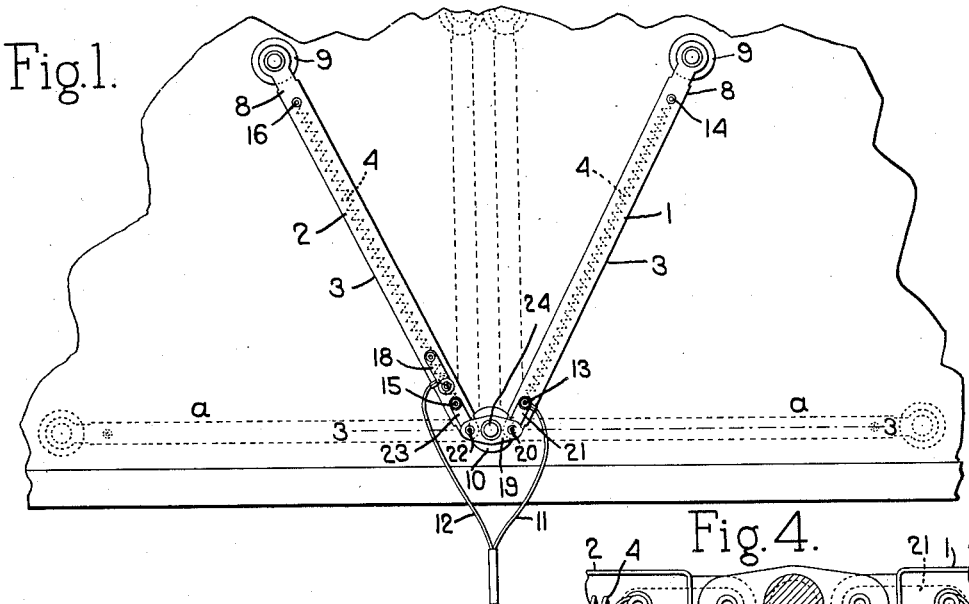
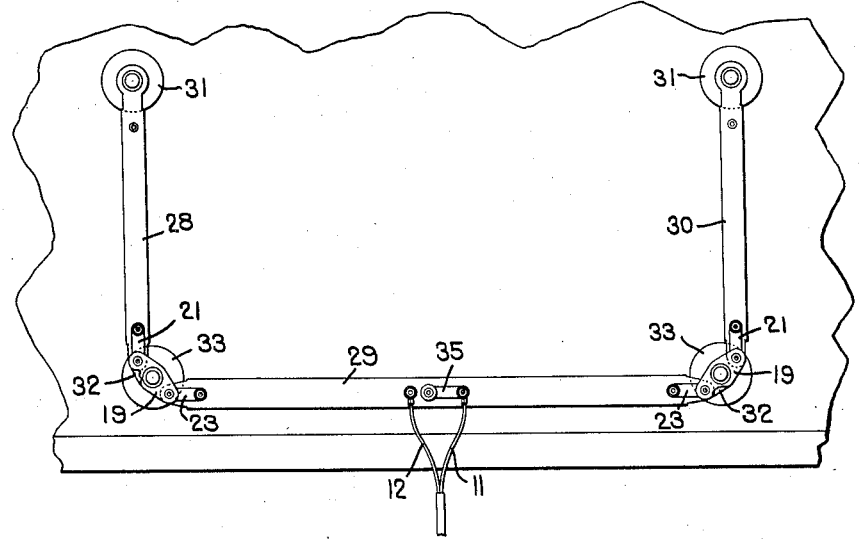
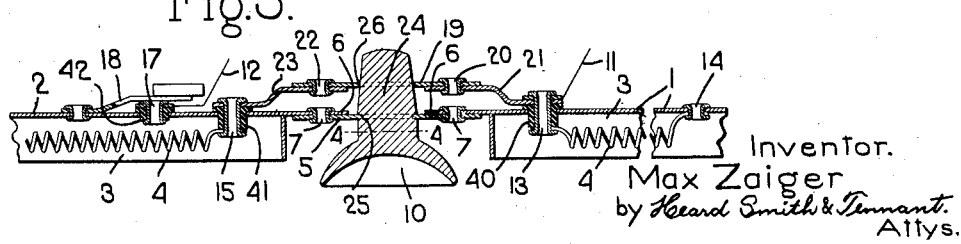
Inventor.
Max Zaiger
by Heard Smith & Tennant.
Attys.

Patented Aug. 14, 1934

1,970,482

UNITED STATES PATENT OFFICE 1,970,482

WINDSHIELD HEATER

Max Zaiger, Swampscott, Mass.

Application November 10, 1933, Serial No. 697,462

9 Claims. (Cl. 219—19)

This invention relates to windshield heaters and particularly to electric windshield heaters.

One of the objects of the invention is to provide an improved windshield heater which is made in sections pivotally connected together so that when the heater is applied to the windshield the sections may be placed in different angular positions relative to each other depending upon the area of the windshield which it is desired to heat, and, when the heater is removed from the windshield and is to be laid away or stored, the sections may be folded together and thereby form a package of relatively small size.

In order to give an understanding of the invention I have illustrated in the drawings some selected embodiments thereof which will now be described after which the novel features will be pointed out in the appended claims.

Fig. 1 is a view of a portion of a windshield having a windshield heater embodying my invention applied thereto;

Fig. 2 is a similar view showing a different form of windshield heater;

Fig. 3 is an enlarged section on the line 3—3, Fig. 1;

Fig. 4 is a section on the line 4—4, Fig. 3;

The windshield heater herein shown is of that known type which comprises an elongated housing open on one side and adapted to be attached to the windshield by means of suction cups or otherwise with the open side facing the windshield, and a heating coil enclosed by the housing and which furnishes the heat necessary to heat the windshield.

As stated above, in the present invention the windshield heater is made with a plurality of sections which are pivotally connected together. In Fig. 1 there are two such sections, indicated generally at 1 and 2. Each heater section is formed with an elongated housing 3 having a general channel shape and a heating coil 4 enclosed by the housing and extending longitudinally thereof. These two sections 1 and 2 are pivotally connected together so that they can be swung into different angular positions relative to each other. For instance, in Fig. 1 said sections are shown in full lines as having such an angular relation to each other that the heater has a general V shape and in one dotted line position said sections are shown as arranged in alignment with each other and in another dotted line position they are shown as folded together.

Various ways of pivotally connecting the two sections 1 and 2 may be employed but I will preferably provide a pivotal connection which will not only permit them to be moved into positions in line with each other but will also permit them to be folded close together in parallel relation. In the construction herein shown these two sections 1 and 2 are pivotally connected together through the medium of a connecting link 5. Each of the sections 1 and 2 is formed with a wing 6 forming an extension of the housing and the two wings 6 are pivotally connected to the opposite ends of the link 5 as shown at 7. This construction permits the two sections 1 and 2 to be swung into different angular positions relative to each other as shown in Fig. 1.

The windshield heater may be secured to the windshield in any convenient way. I prefer, however, to use the well-known suction cup device for this purpose. The free end 8 of each of the sections 1 and 2 will be provided with a suitable suction cup 9 and the link 5 is also provided with another suction cup 10. By means of these suction cups the heater can be secured to the windshield in any desired position and with the sections 1 and 2 having any desired angular relation.

The wires of the heating circuit are indicated at 11 and 12 and these wires may be attached to any suitable plug or attachment device by which the wires can be connected into the lighting circuit of the automobile or to any of the circuits which are supplied with current from the battery. The wire 11 is shown as secured to a terminal 13 which is insulated from the housing of the section 1 by suitable insulation 40 and to which one end of the heating coil 4 is secured. The other end of the heating coil 4 will be secured to a non-insulated terminal 14 carried by the housing. The insulated terminal 13 of the section 1 is also connected to an insulated terminal 15 carried by the housing of the section 2, said terminal 15 being insulated from said housing by insulation 41. One end of the coil 4 of the housing 2 is also connected to this insulated terminal 15. The other end of the coil 4 for the section 2 is connected to a non-insulated terminal 16 situated adjacent the free end of said section 2.

The circuit wire 12 is secured to a switch terminal 17 which is carried by but insulated from the section 2 by means of insulation 42. This switch terminal is adapted to co-operate with a switch 18 pivotally connected to the section 2. The electrical connection between the insulated terminal 13 on the section 1 and the insulated terminal 15 on the section 2 is made through a plate 19, one end of which is pivoted at 20 to a terminal connection 21 that is secured to and extends from the insulated terminal 13. The other end of said plate 19 is pivoted at 22 to a similar terminal connection 23 that is secured to the insulated terminal 15. Both terminal connections 21 and 23 are insulated from the sections 1 and 2.

The pivots 20 and 22 between the plate 19 and the terminal connections 21 and 23 are in line with the pivots 7 between the link 5 and the wings 6. Because of this arrangement each section can freely turn about its pivot 7 and its aligned pivot 20 or 22, without causing any binding action.

The plate 19 is held in proper alignment with the link 5 through the medium of the suction cup 10. As herein shown the suction cup is provided with a stem 24 which extends through an opening in the link 5, said stem having a peripheral groove 25 in which the portion of the link 5 circumjacent said opening is received. The connecting plate 19 is also provided with an opening 26 through which the stem of the suction cup is received, and said stem thus holds the plate 19 and link 5 in their aligned relation. With this arrangement the two heating coils 4 will be connected in multiple and the switch 18 will serve to open and close the circuit of both heating coils.

The advantage of this articulated construction is that it provides for distributing the heat generated by the heating coils in a way to be most effective for the conditions existing at any particular time. If the conditions are such that a small amount of heat is sufficient to keep each windshield free from snow or ice and it is desirable to have as large an area of the windshield as possible clear, then the two sections of the heater may be placed in alignment with each other as shown by the dotted line position $a$. In this case the heater will be effective in keeping the windshield clear for a space equal to the full length of the heater. On the other hand, if the conditions are such that a higher degree of heat is necessary to keep the windshield clear from snow and ice then the two sections of the windshield can be folded partially together as shown in full lines Fig. 1, thereby to partially enclose an area of the windshield. With this arrangement heat will be applied to both sides of the V-shaped windshield area between the two sections 1 and 2 and this smaller area of the windshield will be thus heated by both sections 1 and 2.

The suction cups permit the heater to be readily applied to the windshield in any position and with the sections 1 and 2 having any desired relative angular relation.

In Fig. 2 I have shown a slightly different embodiment of the invention wherein the windshield heater comprises the three sections 28, 29 and 30 which are pivotally connected together. In this embodiment the central section 29 is shown as being longer than the two end sections 28 and 30. The pivotal connection between each of the end sections 28 and 30 and the intermediate section 29 may have the same construction as that shown in Fig. 3. In this case the free ends of the end sections 28 and 30 are provided with suction cups 31 and each of the connecting links 32 which connect one of the end sections with the intermediate section, is also provided with a suction cup 33. This permits the heater to be applied to the windshield in any desirable position and with the various sections thereof having any desired relative arrangement. In this embodiment the circuit wires 11, 12 are shown as connected to the intermediate section 29, a switch 35 being employed similar to the switch 18 for opening and closing the heating circuit.

When the heater is removed from the windshield the sections thereof may be folded tight together thus reducing very materially the space necessary to store the heater. In the embodiment shown in Fig. 1 the space occupied by the heater when in its folded condition is only about half as long as the full length of the extended heater and in the embodiment shown in Fig. 2 the space required to store the folded heater is only of a length equal to the intermediate section 29.

In all embodiments of the invention the pivotal connection between the sections is such as to permit them to fold closely together in parallel relation and this is provided for by making the pivotal point 7 for either section out of line with the connected section when the parts are folded. For instance, when the heater is folded with the two sections in parallel relation the link 5 will extend transversely to said sections and the pivotal point 7 for the section 1 is sufficiently at one side of the median line of the section 2 so as to permit the two sections to be folded into a parallel arrangement. Similarly, the pivot point 7 for the section 2 is sufficiently at one side of the median line of the section 1 to permit of such folding action.

I claim:

1. A windshield heater comprising a plurality of pivotally connected heating members each having an elongated housing open on one side and a heating coil enclosed in the housing, the pivotal connection of each member being sufficiently at one side of the median line of the other member to permit the members to be folded into substantially parallel relation side by side.

2. A windshield heater for automobiles comprising two heating members each having an elongated housing open on one side and a heating coil within the housing, a connecting link pivotally connected to each member at one end thereof, a suction cup carried by the free end of each member and an additional suction cup carried by the connecting link, whereby the heater may be applied to the windshield with the two heating members having any desired angular relation to each other.

3. A windshield heater comprising two heating members, each having an elongated housing open at one side and a heating coil enclosed within the housing, a connecting link having one end pivoted to an end of one member and the other end pivoted to an end of the other member, a suction cup carried by the free end of each member, an additional suction cup carried by said link, said cup having a stem extending through the link, an electrical connection between the two heating coils comprising a plate separate from said link and provided with an aperture through which the stem of the suction cup extends, and terminal connections connecting said plate to each of the coils.

4. A windshield heater comprising two heating members each having an elongated housing, a connecting link pivotally connected to each member at one end thereof, each member having an insulated terminal near the pivoted end thereof and a non-insulated terminal adjacent the other end, a heating coil in each housing connecting the terminals thereof, a terminal connection connected to each insulated terminal, a connecting conductor plate pivotally connected to the terminal connections, and means for supplying current to said coils.

5. A windshield heater comprising two heating members each having an elongated housing, a connecting link pivotally connected to each member at one end thereof, each member having an insulated terminal near the pivoted end thereof and an non-insulated terminal adjacent the other end, a heating coil in each housing connecting the terminals thereof, a terminal connection connected to each insulated terminal, a connecting conductor plate pivotally connected to the terminal connections, and means for supplying current to said coils, the pivotal points of the connecting terminals with the plate being in line with the pivotal points between the housings and the link.

6. A windshield heater comprising two heating members each having an elongated housing, a connecting link pivotally connected to each member at one end thereof, each member having an insulated terminal near the pivoted end thereof and a non-insulated terminal adjacent the other end, a heating coil in each housing connecting the terminals thereof, a terminal connection connected to each insulated terminal, a connecting plate pivotally connected to the terminal connections, means for supplying current to said coils, the pivotal points of the connecting terminals with the plate being in line with the pivotal points between the housings and the link, and a suction cup secured to said link and having a stem extending through said connecting plate.

7. A windshield heater comprising two heating members, each having an elongated housing open at one side and a heating coil enclosed within the housing, a link member pivotally connected to both housings and forming a pivotal connection therebetween, a suction cup carried by the free end of each heating member, and an additional suction cup carried by said link member, the link connection between the heating members permitting them to be folded into parallel relation side by side.

8. A windshield heater comprising two heating members each having an elongated housing, a connecting link pivotally connected to both members at spaced points on the link and forming a pivotal connection therebetween, a suction cup carried by the free end of each heating member, an additional suction cup carried by the connecting link, a heating coil in each housing, a terminal connection carried by each housing and connected to the heating coil therein but insulated from the housing, and a connecting conductor separate from the connecting link pivotally connecting the terminal connections.

9. A windshield heater comprising two heating members each having an elongated housing, a connecting link pivotally connected to each member at one end thereof, each member having an insulated terminal near the pivoted end thereof and a non-insulated terminal adjacent the other end, a heating coil in each housing connecting the terminals thereof, a terminal connection connected to each insulated terminal, a connecting conductor plate pivotally connected to the terminal connections, means for supplying current to said coils, and means for supporting said heater on the windshield.

MAX ZAIGER.